(12) United States Patent
Beck

(10) Patent No.: US 7,797,351 B2
(45) Date of Patent: Sep. 14, 2010

(54) USER INTERFACE BASED MODELING OF WEB SERVICES AND BATCH INPUT TEMPLATES

(75) Inventor: Stefan Beck, Mannheim (DE)

(73) Assignee: SAP AG, Walldorf (DE)

( * ) Notice: Subject to any disclaimer, the term of this patent is extended or adjusted under 35 U.S.C. 154(b) by 396 days.

(21) Appl. No.: 11/045,658

(22) Filed: Jan. 28, 2005

(65) Prior Publication Data

US 2006/0173892 A1 Aug. 3, 2006

(51) Int. Cl.
*G06F 17/30* (2006.01)
(52) U.S. Cl. ..................................... 707/803
(58) Field of Classification Search ................. 707/102, 707/100, 803; 715/512
See application file for complete search history.

(56) References Cited

U.S. PATENT DOCUMENTS

| | | | | |
|---|---|---|---|---|
| 6,115,713 | A * | 9/2000 | Pascucci et al. | 707/10 |
| 6,633,910 | B1 * | 10/2003 | Rajan et al. | 709/224 |
| 6,965,886 | B2 * | 11/2005 | Govrin et al. | 706/45 |
| 2006/0098899 | A1 * | 5/2006 | King et al. | 382/305 |
| 2006/0173873 | A1 * | 8/2006 | Prompt et al. | 707/100 |

* cited by examiner

*Primary Examiner*—John R. Cottingham
*Assistant Examiner*—Noosha Arjomandi
(74) *Attorney, Agent, or Firm*—Finnegan, Henderson, Farabow, Garrett & Dunner, LLP

(57) ABSTRACT

Methods and apparatus, including computer program products, for generating a data input template. A system captures data objects and event objects communicated between a client and an application program, stores a copy of the captured objects, and generates a template based on the stored objects. The client interface has a hierarchical structure. Each data object includes an address identifier specifying a location within this hierarchical structure with which it is associated, and metadata is generated based on this address identifier. Each event object includes a record of one or more actions performed by a user, and metadata is generated based on this record. The metadata is used in structuring the template, enabling the template to correspond to the hierarchical structure of the client interface. The template can be used to generate a web services description language document, which can be provided to third party users over a network.

18 Claims, 7 Drawing Sheets

```
ROOT...
    PARENT 1
        CHILD 1 <data value> <metadata>
                <Event Object> <metadata>
        CHILD 2
            GRANDCHILD 1 <data value> <metadata>
                    <Event Object> <metadata>
            GRANDCHILD 2 <data value> <metadata>
                    <Event Object> <metadata>
        CHILD 3
            GRANDCHILD 1 <data value> <metadata>
                    <Event Object> <metadata>
    PARENT 2
        CHILD 2
            GRANDCHILD 1 <data value> <metadata>
                    <Event Object> <metadata>
    PARENT 3
        CHILD 1 <data value> <metadata>
                <Event Object> <metadata>
        CHILD 2 <data value> <metadata>
                <Event Object> <metadata>
        CHILD 3
            GRANDCHILD 1 <data value> <metadata>
                    <Event Object> <metadata>
            GRANDCHILD 2 <data value> <metadata>
                    <Event Object> <metadata>
        CHILD 5
            GRANDCHILD 1 <data value> <metadata>
                    <Event Object> <metadata>
            GRANDCHILD 2 <data value> <metadata>
                    <Event Object> <metadata>
```

```
ROOT...
    PARENT 1
        CHILD 1 <request data>
        CHILD 2
            GRANDCHILD 1 <request data>
            GRANDCHILD 2 <request data>
        CHILD 3
            GRANDCHILD 1 <request data>
    PARENT 2
        CHILD 2
            GRANDCHILD 1 <request data>
    PARENT 3
        CHILD 1 <request data>
        CHILD 2 <request data>
        CHILD 3
            GRANDCHILD 1 <request data>
            GRANDCHILD 2 <request data>
        CHILD 5
            GRANDCHILD 1 <request data>
            GRANDCHILD 2 <request data>
```

USER INTERFACE BASED MODELING OF WEB SERVICES AND BATCH INPUT TEMPLATES

BACKGROUND

The present invention relates to data processing by digital computer, and more particularly to user interfaced modeling of web services and batch input templates.

An internet is a group of networks and individual computers communicating using a common protocol. The Internet is a world-wide "network of networks" that use the TCP/IP (Transmission Control Protocol/Internet Protocol) protocol suite for communications. TCP/IP is a set of protocols and programs used to interconnect computer networks and to route traffic among different types of computers. These protocols describe allowable data formats, error handling, message passing, and communication standards.

Many organizations are in the process of connecting to the Internet to take advantage of Internet services and resources. Businesses and agencies are now using the Internet or considering Internet access for a variety of purposes, including exchanging e-mail, distributing agency information to the public, and conducting research. Many organizations are connecting their existing internal local area networks to the Internet so that local area network workstations can have direct access to Internet services.

One issue that has arisen regarding using the Internet for business is how to build suitable interfaces into business software systems for automated data input on demand. A company may want to optimize their business processes by allowing its business partners to access the business software systems of the company over the Internet. For example, a company may want to enable its business partners to have the capability to create sales orders directly in the company's business systems. Generally, the IT departments of the companies have to implement customized back-end functionality to make this arrangement possible. These types of solutions are tailored to the specific computer configurations of the companies involved; there is no standard way to enable more companies to join in; and there is no standard way to allow for corrections to the data if the business partners make errors when entering data into the business software systems.

SUMMARY

The present invention provides complementary methods, systems, and programs for a user interface based modeling and definition of services and batch input templates. In accordance with one implementation of the invention, a system generates a data input template by capturing data objects that are communicated from a client interface to an application program, capturing event objects that are communicated to the application program, storing a copy of the captured data objects and event objects, and then generating a template for data input based on the stored data objects. The system captures data objects by monitoring the data objects as they are communicated from the client interface to the application program, and determining which data objects are accepted by the application program. Only the accepted data objects are captured and copied. Likewise, the system captures event objects by monitoring the event objects as they are communicated to the application program, and then determining which event objects are accepted by the application program. Again, only the accepted event objects are captured and copied.

In one implementation, the client interface is formatted in a hierarchical structure, and each data object includes an address identifier that identifies a location within the hierarchical structure with which the data object is associated. When the system stores a copy of the data object, metadata for each data object is generated based on the address identifier, and the data objects are stored with their associated metadata. Similarly, each event object includes a record of one or more actions performed by a user. When the system stores a copy of an event object, metadata for each event object is generated based on the record of the one or more actions, and the event objects are stored with their associated metadata. The template that is generated by the system can be structured based at least in part on the metadata, and the metadata enables the template to correspond to the hierarchical structure of the client interface.

In another implementation, the template that is generated by the system can be used to generate a web services description language document, and this document can be provided to third party users over a network.

The invention can be implemented to realize one or more of the following advantages. The invention enables third-parties to access the application programs of a company using internet-based interfaces. This reduces the number of problems that can arise when companies use different platforms or protocols to run their application programs. The invention also reduces the amount of time and effort required by a user when batch data is being input into a data processing system.

The details of one or more implementations of the invention are set forth in the accompanying drawings and the description below. Further features, aspects, and advantages of the invention will become apparent from the description, the drawings, and the claims.

DESCRIPTION OF DRAWINGS

FIG. 6 is a data input template created by a recording application program.

FIG. 7 is a web services interface.

Like reference symbols in the various drawings indicate like elements.

DETAILED DESCRIPTION

Figure 1:
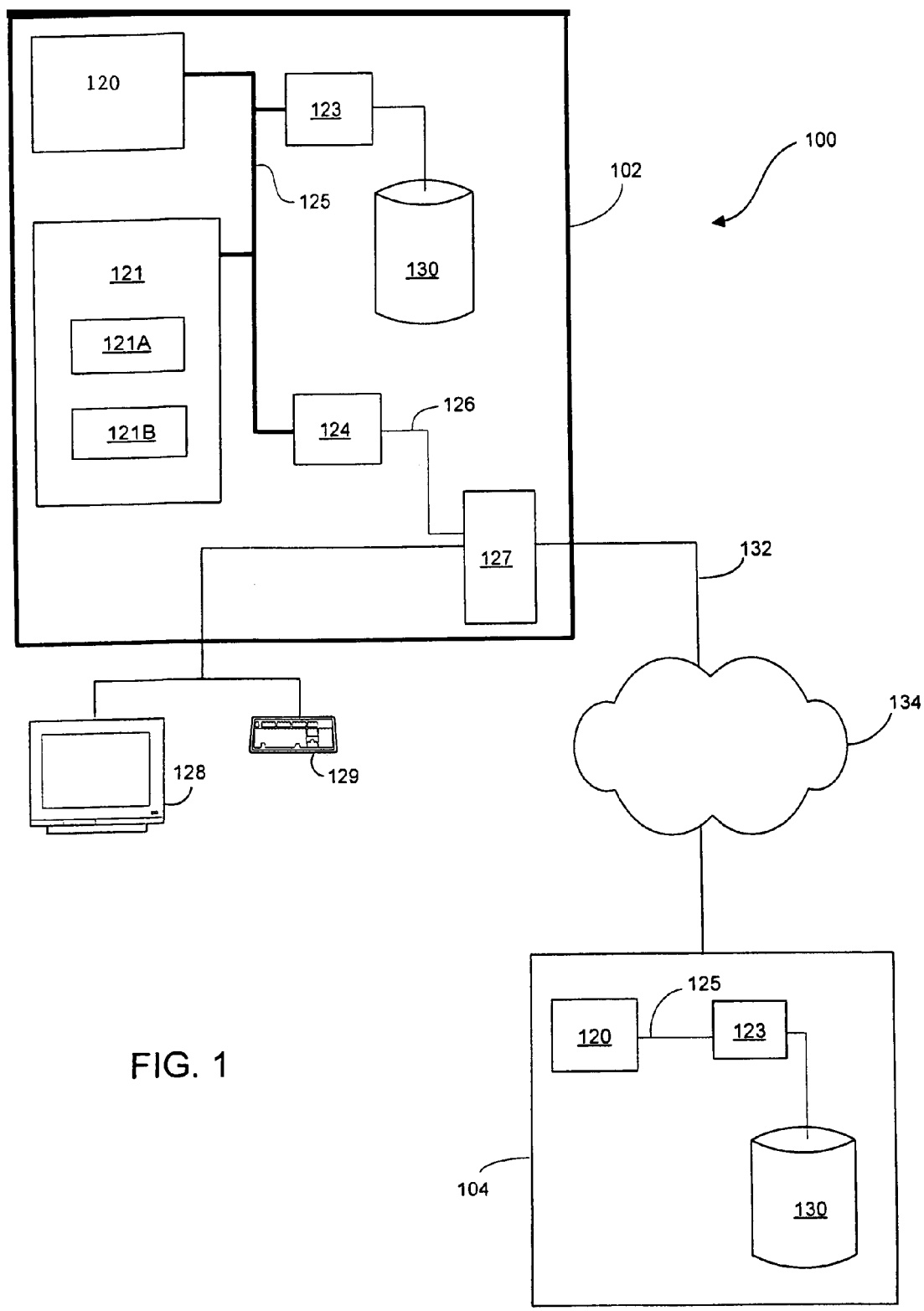
FIG. 1 is a block diagram of a client-server system.

FIG. 1 is a block diagram of a client-server system 100 suitable for implementing apparatus or performing methods in accordance with the invention. Client-server system 100 of FIG. 1 includes a client computer system 102 and a server computer system 104. Client computer system 102 includes a processor 120, a memory 121, a hard drive controller 123, and an input/output (I/O) controller 124 coupled by a central processor unit (CPU) bus 125. Memory 121 can include a random access memory (RAM) 121A, and a program memory 121B, for example, a writable read-only memory (ROM) such as a flash ROM. Client computer system 102 can be preprogrammed, in ROM, for example, or it can be programmed (and reprogrammed) by loading a program from another source (for example, from a floppy disk, a CD-ROM, or another computer system) into a random access memory for execution by the processor. Hard drive controller 123 is coupled to a hard disk 130 suitable for storing executable computer programs, including programs embodying the present invention, and data.

The I/O controller 124 is coupled by means of an I/O bus 126 to an I/O interface 127. The I/O interface 127 receives and transmits data in analog or digital form over communication links 132, e.g., a serial link, local area network, wireless link, or parallel link. Also coupled to the I/O bus 126 is a display 128 and a keyboard 129. Alternatively, separate connections (separate buses) can be used for the I/O interface 127, display 128 and keyboard 129.

Server computer system 104 generally includes some or all of the same components described above for client computer system 102, such as processor 120, hard drive controller 123, CPU bus 125, and hard disk 130. Other components that can be included in server computer system 104 are not shown for clarity. Server computer system 104 can communicate with client computer system 102 over a network 134, such as a LAN, a WAN, or the Internet, in analog or digital form using communication links 132 as described above.

Client-server describes the relationship between two computer programs when one program, the client, makes a service request from another program, the server, which fulfills the request. The server generally stores one or more application programs that actually process the client requests, therefore the client is ultimately communicating with these application programs. Although programs within a single computer can use the client-server idea, client-server typically refers to relationships within a network. The client-server model provides a convenient way to interconnect programs that are distributed across different locations within a network. Computer transactions using the client-server model are very common. For example, when a user wants to retrieve a data object from a database, a client program at the user's computer can forward a request to a server program that is coupled to the database. The server program can process the request, and can return the requested data object to the user's computer.

Figure 2:
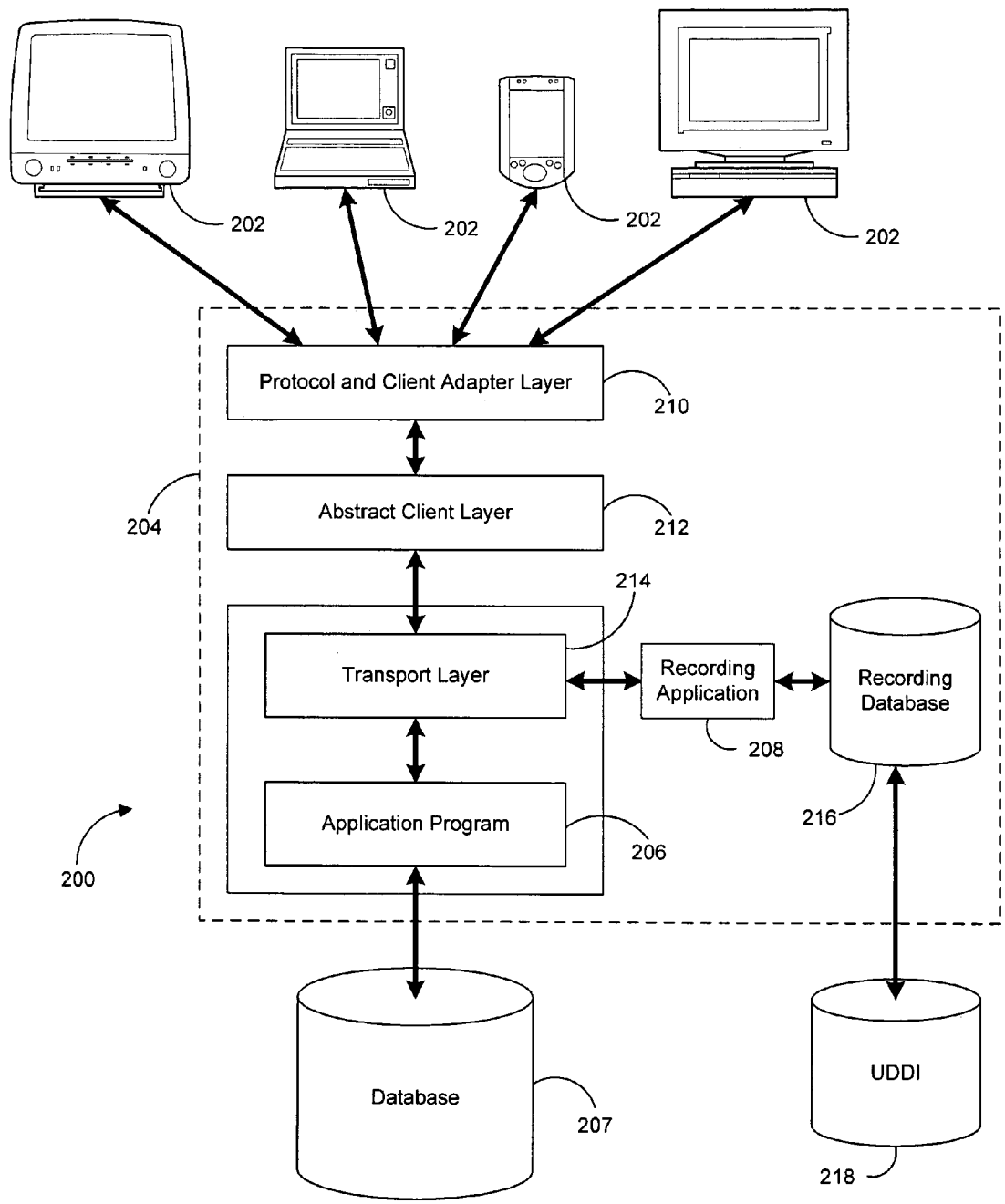
FIG. 2 is a block diagram of a client-server system with features of the invention.

FIG. 2 is a block diagram of a client-server system 200 according to the invention. The system 200 includes multiple client computer systems 202 and a server computer system 204. Client systems 202 generally implement a client interface through which a user can communicate with the server system 204.

An application program 206 resides on the server system 204 to process client requests and to provide data to the client systems 202. An application program is any program or group of programs designed to perform a specific function directly for the client systems 202, or for another application program. In FIG. 2, the application program 206 is shown in communication with a database 207. Depending on the type of application program that resides on the server system 204, the database 207 may or may not be necessary. A recording application program 208 also resides on the server system 204.

The system 200 can accommodate many different client configurations, and FIG. 2 shows multiple client computer systems 202 in communication with the server system 204. The different configurations for the client computer systems 202 include, but are not limited to, personal computers, laptop computers, personal digital assistants (PDAs), or cell phones. These client systems 202 can run on different operating systems such as Microsoft® Windows, Apple® Mac OS, Sun® Solaris, UNIX, Linux, Palm® OS, Microsoft® Windows CE, or Microsoft® PocketPC. Additionally, there are different protocols by which the client systems 202 can communicate with the server system 204. For instance, the client systems 202 can be implemented to interact with the server 204 using hypertext transfer protocol (HTTP) with a JavaScript enabled web browser, HTTP with server-side rendering, or VoiceXML (extensible markup language), to name just a few of many examples.

Server system 204 implements several different layers to enable requests from the client systems 202 to be received and understood by the application program 206. These layers include a protocol and client adapter layer 210, an abstract client layer 212, and a transport layer 214.

The protocol and client adapter layer 210 allows the server system 204 to interact with a wide range of client system configurations.

Since different client configurations can use different protocols for communicating with the server system 204, the server system 204 uses the protocol and client adapter layer 210 to interact directly with the client systems 202. The protocol and client adapter layer 210 is built into the software for the server system 204, and can understand many or all of the available protocols needed to communicate with the different configurations available for the client systems 202. The architecture is flexible so that new adapters for additional protocols can be integrated easily. The protocol and client adapter layer 210 and an abstract client layer 212 translate the communications into a protocol that is understood by the application program 206. This arrangement allows the application program 206 to be independent of any particular client configuration. Clients of all types can access and interact with the application program 206 without any additional effort.

After the protocol and client adapter layer 210 translates the incoming requests from the client systems 202, the translated communications are passed to the abstract client layer 212, which acts as a virtual client to communicate with the application program 206. From the perspective of the application program 206, there is only one client with which the application program 206 interacts. Therefore, the application program 206 is developed to interact with just one client protocol, even though it truly interacts with a variety of client protocols and configurations through the protocol and client adapter layer 210 and the abstract client layer 212.

Translated client requests from the abstract client layer 212 are passed to the application program 206 by way of a transport layer 214. The transport layer 214 primarily routes communications within the server system 204, not only with the application program 206, but also with other components such as a recording application program 208.

When active, the recording application program 208 monitors ongoing communications between the client systems 202 and the server system 204. Certain data objects that pass from the client systems 202 to the application program 206 within the incoming requests are captured and copied by the recording application program 208. These data objects contain the actual data that has been entered by a user at the client system 202. Certain event objects are also captured and copied by the recording application program 208. The event objects generally contain a record of one or more actions performed by the user. The protocol and client adapter layer 210 can determine what these actions are based on the incoming requests from the client systems 202 and can generate corresponding event objects. In one implementation, the requests include data objects, and the data objects can include both data entered by the user and event objects. The copied data objects and event objects are stored on a recording database 216.

The copied data objects and event objects are used to create a data input template. This template can be used for a variety of purposes, such as providing a repetitive batch input for the application program 206. The batch input can occur when the application program 206 requires multiple sets of data objects. If the data objects are the same in each set, the data input template can be used to repeatedly provide the same data objects to the application program 206. If one or more of the data objects change in each set, a user or an application program can modify only the particular data objects in the data input template that change, and use the template to provide input to the application program 206. For instance, in a batch input process, each set of data objects to be entered can contain one data object that stores a calendar date. The date can be an item that varies across the different sets of data objects. Rather than re-entering all of the data objects that do not change for the batch input, the data input template can be used. All of the data objects already store the repetitive data, and a user or an application program can edit the one data object in each set that stores the calendar date. The data input template therefore enables a batch process that is less burdensome than re-entering all of the data objects, and repetitive tasks that have to be performed can be carried out efficiently.

Another use of the data input template is to provide a foundation for web services. Since the recording application program 208 copies data objects that are received from the client systems 202, the data input template can be structured in a fashion that is similar to the structure of the client interface used by the client systems 202 to interact with the server system 204. This data input template can be published over the Internet and made available to third parties, thereby allowing third parties to enter data into the data input template. This enables these third parties to provide data in batch form to the-application program 206 over the Internet using common web browsers such as Microsoft® Internet Explorer, available from Microsoft Corporation of Redmond, Wash., or Netscape® Navigator, available from Netscape Communications Corporation of Mountain View, Calif. When the data input template is published to provide web services, the template can be listed on a Universal Description, Discovery, and Integration (UDDI) registry 218 to make it available to third parties. The UDDI registry is an XML-based registry for businesses worldwide to list themselves on the Internet. The UDDI registry streamlines online transactions by enabling companies to find one another on the Internet and to make their systems interoperable for e-commerce.

Figure 3:
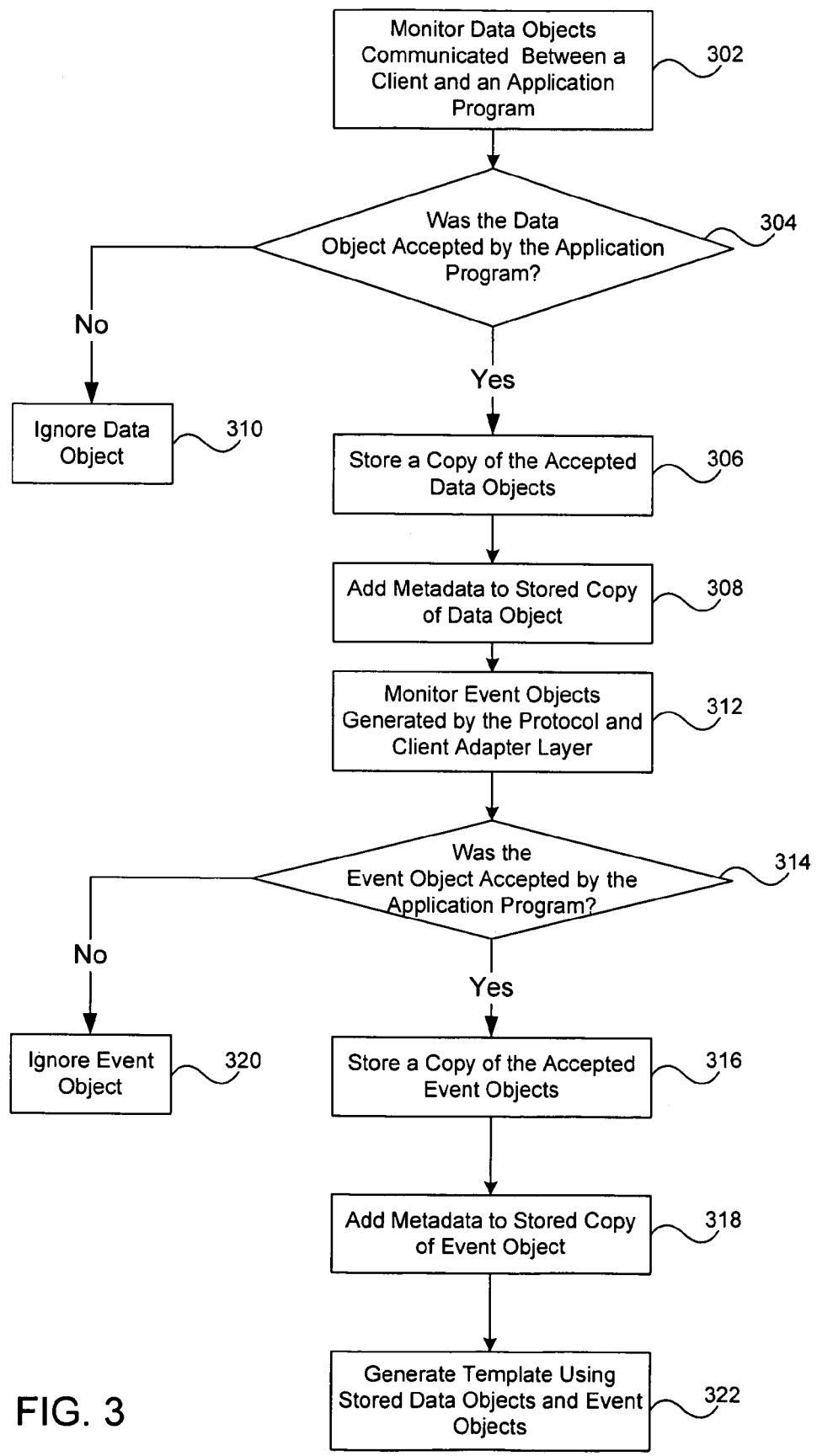
FIG. 3 shows a method for recording a data input template.

FIG. 3 shows a method for recording a data input template in accordance with an implementation of the invention. A data input template recording session is often initiated by the client system and is performed to capture a complete transaction between the client system and the application program. For example, if the application program is performing a business function, the recording session is performed to capture a concrete and complete business case. In one implementation, if the client system interacts with the server system using URL addresses to request specific portions of the application program, the recording of a data input template can be initiated by placing a marker in the URL address. For instance, the text string "recording=" or "recording=on" can be added to the requested URL address, and when this text string is received by the server system, the method for recording a data input template can be initiated.

Once recording has begun, the standard application processing begins and the server system allows the recording application program to monitor the flow of data objects between the client system and the server system (step 302). The recording application program is only concerned with those data objects that contain data entered by the user. These data objects are monitored as they are delivered to the application program, which can either accept or reject the data objects. If the application program rejects a data object, it is generally because a particular type of data was expected, and the user entered data that did not correspond to that particular type. The recording application program monitors the response of the application program to the data objects to determine which data objects were accepted by the application program (step 304).

When the application program accepts a data object, the recording application program stores a copy of that data object on the recording database (step 306). The recording program can also add metadata to the data object stored on the recording database to provide further information about the data object, such as information identifying its type (step 308). Other metadata can be extracted from the data object itself, as described below. The recording application program ignores data objects not accepted by the application program (step 310).

Event objects are treated in similar fashion to the data objects. The recording application program monitors event objects (step 312) and determines which of them are accepted by the application program (step 314). Accepted event objects are copied by the recording application program and stored on the recording database (step 316). As with the data objects, the recording application program can generate metadata to provide further information about the event objects and can store this metadata with the event objects on the recording database (step 318). Unaccepted event objects, caused for instance by unaccepted data objects, are ignored by the recording application program (step 320).

When the session between the client system and the server system has concluded, the recording database contains every data object and every event object that was accepted by the application. These objects represent a flow of data that occurred between the client system and the application program as a user entered values in a graphical user interface (GUI) presented to the user by a client system. This in turn provides an outline showing which data are required by the application program and in what order. In essence, this flow of data captures a walk through of the different application screens shown on the GUI when the user was entering data and viewing output that was generated in response to that data. This walk through can be replicated by generating a template based on the data objects and event objects stored on the recording database (step 322). The template can be used for future data input operations since the template follows the flow of the application program.

Figure 4:
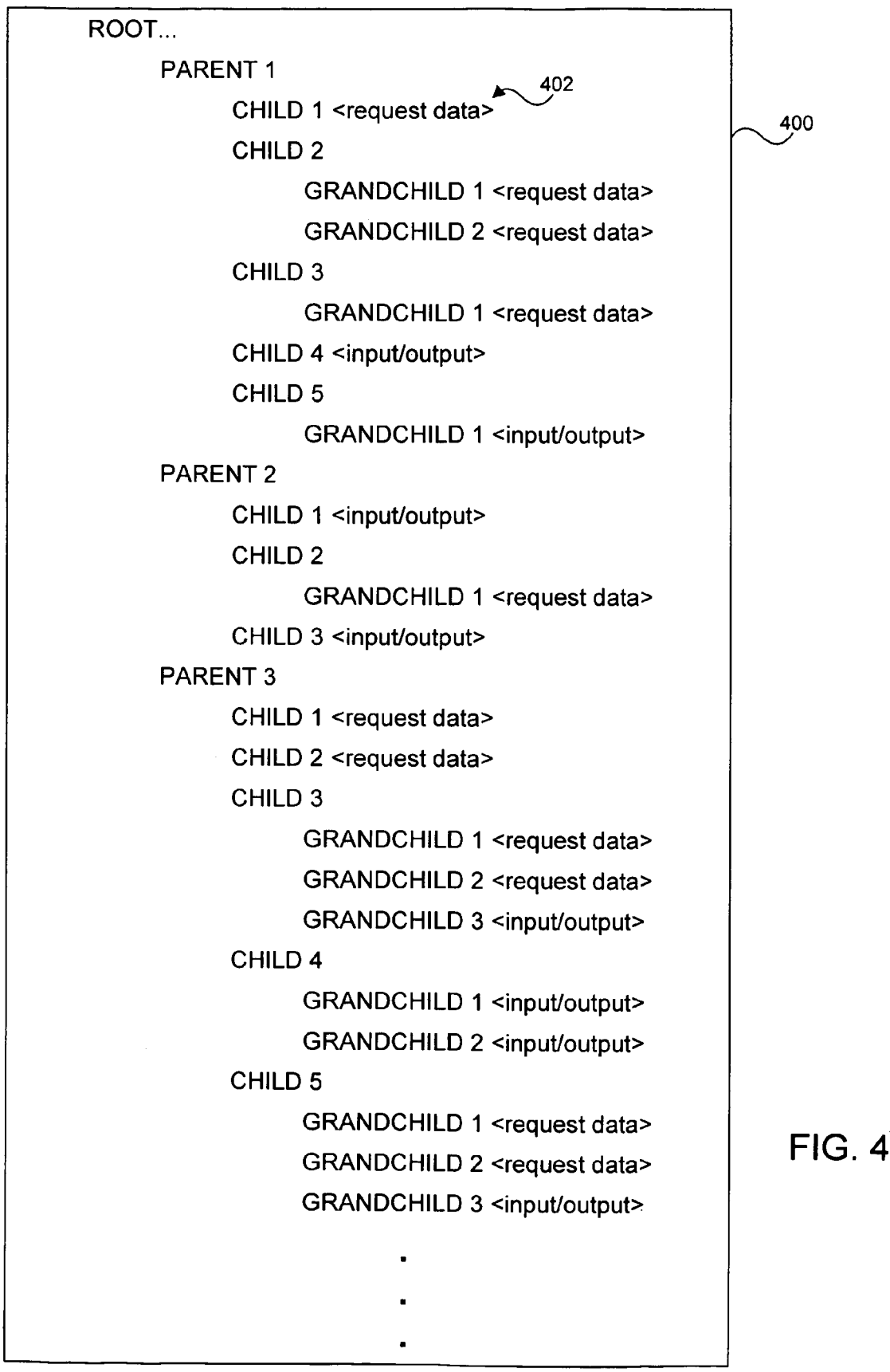
FIG. 4 is an example of a hierarchical client interface structure.

FIG. 4 shows an example of a definition of a hierarchical client interface structure 400 that can be realized and presented as a GUI at a client system 202. The hierarchical structure defines a layout for the data that is displayed to a user. In some implementations, this structure 400 can be written in hypertext markup language (HTML) or extensible markup language (XML). The structure typically includes a root directory with a number of parent objects. Each parent object can have one or more child objects, each child object can have one or more grandchild objects, and so on. The objects define when events occur, such as the input or output of data by the client interface. For instance, if the client interface defined by the structure 400 is used to retrieve data from a database, the objects can define when the data is shown to the user.

The hierarchical client interface structure 400 also defines points when data is requested from a user. As illustrated in the example of FIG. 4, there are branches within the hierarchical structure where a request for data is made, shown by the <request data> markers. The hierarchical structure 400 makes it possible to keep track of the precise location at which a particular data object was requested. So when a user enters data in response to a request, a data object is created to store the data, and an address can be associated with the data object that references the precise location within the client interface structure where the data object was requested. This address information accompanies the data object as it is sent to the server system. In one implementation, the address can take the form of a path that traces the hierarchical structure of the client interface down to the location where the data object was requested, similar to an XPath (XML Path Language) address. In FIG. 4 for instance, the address associated with a data object created for a <request data> marker 402 would be "/PARENT 1/CHILD 1". When the recording application program stores these data objects, it can extract this address information and store it as metadata along with the data objects on the recording database.

Figure 5:
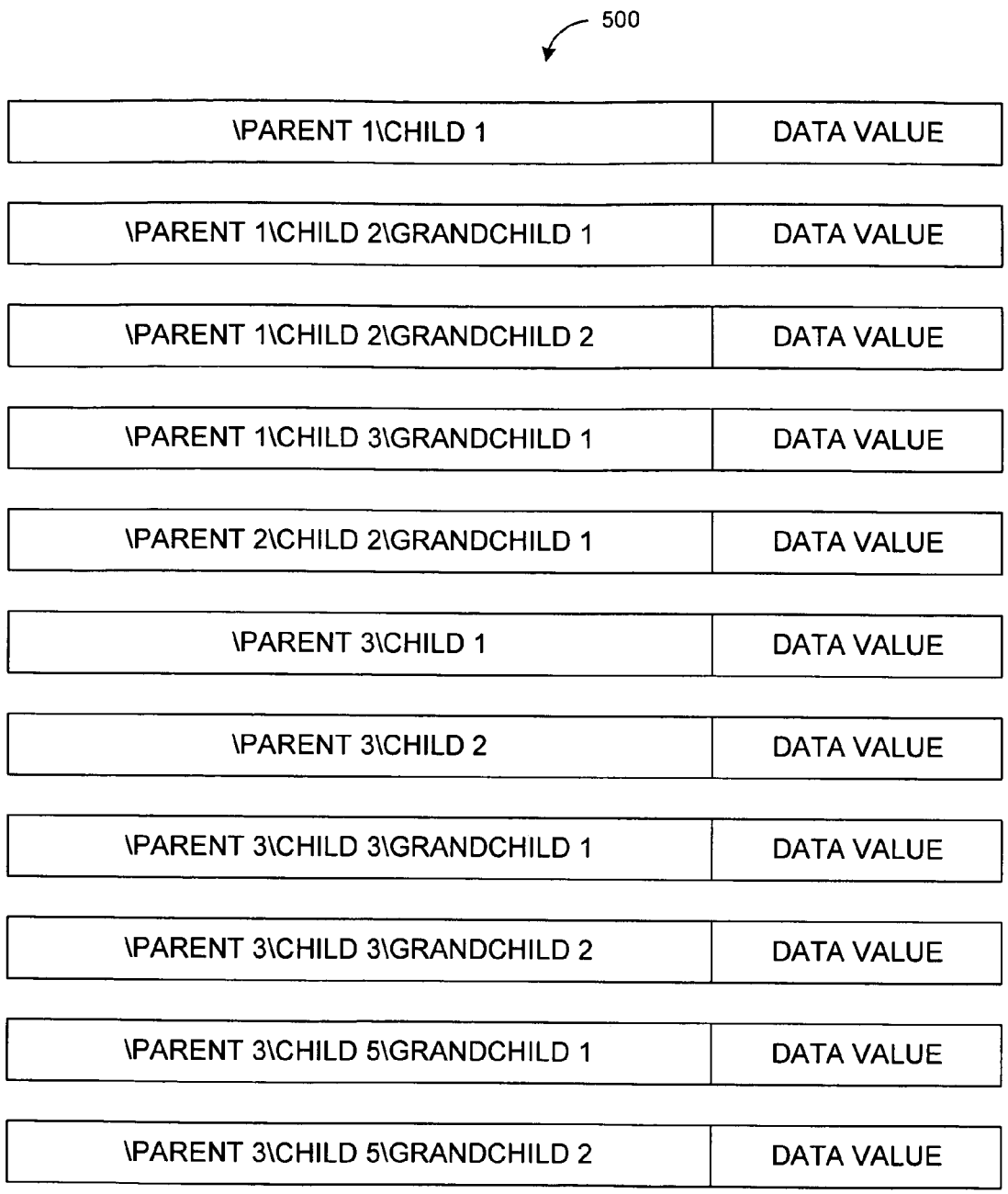
FIG. 5 is one implementation of the data objects.

FIG. 5 illustrates one implementation of the data objects 500. Here, the data objects 500 are configured as name-value pairs, and the name portion of each data object 500 stores the address of the data object. The data objects 500 are based on the client interface structure 400. Accordingly, the address in each data object 500 is a path that references a specific branch of the client interface 400. This address information provides the application program with information concerning where the data object came from, and the paths provide hierarchical information that shows how the data objects 500 relate to one another. The recording application program 208 can use this hierarchical information to structure the data input template to follow the structure of the client interface. This is useful when the data input template is used to provide a batch input to the application program, and it is useful when generating a web services interface for use by third parties.

FIG. 6 is a data input template 600 created by the recording application program 208 using name-value data objects 500. The structure of the data input template 600 is derived from the hierarchical information included in the address of each data object 500. This results in the data input template 600 having a structure that is similar to the client interface 400. The data input template 600 shows each data object that was entered by the user, and following each data object is the event object that was generated by the protocol and client adapter layer 210. The metadata added by the recording application program 208 is shown as well. When the data input template 600 is used for a batch input process, a user can edit the data input template 600 to modify only the particular data objects that change.

In one implementation, the data input template 600 can be generated using XML and XML schema. The structure of the XML document can follow the hierarchy provided in the address paths of the data objects. Since XML tags are self-explaining, it is fairly easy to edit and modify an XML version of the data input template 600 using standard XML editors and tools. The use of XML also allows for an easy transition from the data input template 600 to a web interface for web services.

FIG. 7 is a web services interface 700 according to one implementation of the invention. The web services interface 700 is based on the data input template 600. To create an interface for web services, the data input template 600 is modified to request data rather than simply listing the data objects received from a previous user. The event objects are also not included in the web services interface 700. The result is an interface that requests data in a sequence that follows a walk through of the application program, but without the need for the actual user interface. Standard user interfaces tend to provide rather complex interactions between a client system and a server system as they usually offer access to all of the functionality of an application program. The use of the web services interface 700 provides a stripped down interface that simply requests the necessary data. This yields a less complicated interface that can be used to offer dedicated services. Since a complete transaction between the client system 202 and the server system 204 is recorded, data objects for all of the fields of the transaction are requested by the web services interface 700.

The web services interface 700 can be generated using XML schema, again following the hierarchy provided in the address paths of the data objects, as well as any other metadata generated by the recording application program 208. The XML schema can be used to generate a Web Services Description Language (WSDL) document that can include a typed interface parameter for each value in the template. The WSDL document can be published for use on the UDDI registry.

When a third party uses the web services interface 700, data that is entered is delivered to the server system 204 as a batch input. Typically, the third party is allowed to enter the data without the data being checked for errors or to ensure that is matches the type of data being requested. So when the data is delivered as a batch input, there is a possibility that the application program can reject some of the data objects. Therefore, in one implementation, the application program is allowed to process the batch input until a bad data object is encountered. When a data object is rejected by the application program, the batch input process can be suspended and a predetermined user can be contacted to review and correct the data object. For instance, if a bad data object is received, the application program can generate an e-mail to a user such as a clerk, and the e-mail can include a hypertext link directed to the point in the application program where the data object has been rejected. The clerk can review the data object and try to determine what type of data should have been entered by the third party. The clerk can take whatever actions are necessary to overcome the problem of the rejected data object and resume the processing of the batch input using the standard user interface that the clerk uses during his daily routine.

In an implementation, since the web services interface 700 is used over the Internet, the server system 204 can use a protocol such as Simple Object Access Protocol (SOAP) to communicate with third party clients. The use of SOAP allows the application program 206 to communicate with other programs over the Internet regardless of their operating systems by using HTTP and XML as the mechanisms for information exchange. When a third party attempts to use the web services interface to access the application program 206, a SOAP dispatcher is called by the server system 204 to handle the communications. The SOAP dispatcher can make use of the protocol and client adapter layer 210 if needed. All of the data objects are extracted from the web services interface call by the SOAP dispatcher and are sent to the application program 206 for processing.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in a machine-readable storage device for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Particular embodiments of the invention have been described. Other embodiments are within the scope of the following claims. For example, the steps recited in the claims can be performed in a different order and still achieve desirable results.

What is claimed is:

1. A method for generating data input templates, comprising:
   monitoring data objects that are communicated from a client interface to an application program to determine which of the data objects are accepted by the application program, wherein the data objects comprise data that has been entered by a user at the client interface;
   capturing and copying one or more of the data objects accepted by the application program;
   generating a data input template, the data input template comprising the data associated with the captured and copied data objects and a sequence in which the data was entered into the client interface;
   providing the data input template to the user when the application program requests the user to enter data at the client interface, wherein the data input template enables the user to provide, to the application program, repetitive batch input of the data associated with the captured and copied data objects when the application program requests multiple sets of data, and further wherein the client interface has a hierarchical structure, and each data object includes an address identifier that identifies a location within the hierarchical structure with which the data object is associated;
   generating metadata for each data object based on the address identifier;
   storing the data objects and the metadata; and
   structuring the template based at least in part on the metadata for the data objects and a metadata for event objects so that the structure of the template corresponds to the hierarchical structure of the client interface.

2. The method of claim 1, further comprising:
   capturing the event objects that are communicated to the application program;
   generating the template for data input, the data input template comprising the data objects and the event objects.

3. The method of claim 2, wherein capturing event objects comprises:
   monitoring the event objects that are communicated to the application program to determine which of the event objects are accepted by the application program and capturing only the accepted event objects.

4. The method of claim 2, wherein each event object stores a record of one or more actions performed by a user, the method further comprising:
   generating the metadata for each event object based on the record of the one or more actions performed by the user; and
   storing the event objects with their associated metadata.

5. The method of claim 1, further comprising:
   generating a web services description language document from the template; and providing the web services description language document to third party users over a network.

6. A computer-readable storage medium comprising instructions, tangibly stored on the computer-readable storage medium, the instructions when executed performing a method for generating data input templates according to a method, the method comprising:
monitoring data objects that are communicated from a client interface to an application program to determine which of the data objects are accepted by the application program, wherein the data objects comprise data that has been entered by a user at the client interface;
capturing and copying one or more of the data objects accepted by the application program;
generating a data input template, the data input template comprising the data associated with the captured and copied data objects and a sequence in which the data was entered into the client interface;
providing the data input template to the user when the application program requests the user to enter data at the client interface, wherein the data input template enables the user to provide, to the application program, repetitive batch input of the data associated with the captured and copied data objects when the application program requests multiple sets of data, and further wherein the client interface has a hierarchical structure, and each data object includes an address identifier that identifies a location within the hierarchical structure with which the data object is associated;
generating metadata for each data object based on the address identifier;
storing the data objects and the metadata; and
structuring the template based at least in part on the metadata for the data objects and a metadata for event objects so that the structure of the template corresponds to the hierarchical structure of the client interface.

7. The computer-readable storage medium of claim 6, further comprising:
capturing the event objects that are communicated to the application program;
generating the template for data input, the data input template comprising the data objects and the event objects.

8. The computer-readable storage medium of claim 7, wherein capturing event objects comprises:
monitoring the event objects that are communicated to the application program to determine which event objects are accepted by the application program; and
capturing only the accepted event objects.

9. The computer-readable storage medium of claim 7, wherein each event object stores a record of one or more actions performed by a user, further comprising:
generating the metadata for each event object based on the record of the one or more actions performed by the user; and
storing the event objects with their associated metadata.

10. The computer-readable storage medium of claim 6, further comprising:
generating a web services description language document from the template; and
providing the web services description language document to third party users over a network.

11. A data processing system, comprising:
means for monitoring data objects that are communicated from a client interface to an application program to determine which of the data objects are accepted by the application program, wherein the data objects comprise data that has been entered by a user at the client interface;
means for capturing and copying one or more of the data objects accepted by the application program;
means for generating a data input template, the data input template comprising the data associated with the captured and copied data objects and a sequence in which the data was entered into the client interface;
means for providing the data input template to the user when the application program requests the user to enter data at the client interface, wherein the data input template enables the user to provide, to the application program, repetitive batch input of the data associated with the captured and copied data objects when the application program requests multiple sets of data, and further wherein the client interface has a hierarchical structure, and each data object includes an address identifier that identifies a location within the hierarchical structure with which the data object is associated;
means for generating metadata for each data object based on the address identifier;
means for storing the data objects and the metadata; and
means for structuring the template based at least in part on the metadata for the data objects and a metadata for event objects so that the structure of the template corresponds to the hierarchical structure of the client interface.

12. The system of claim 11, further comprising:
means for capturing the event objects that are communicated to the application program;
means for generating the template for data input, the data input template comprising the data objects and the event objects.

13. The system of claim 12, wherein the means for capturing event objects comprises:
means for monitoring the event objects that are communicated to the application program to determine which event objects are accepted by the application program; and
means for capturing only the accepted event objects.

14. The system of claim 12, wherein each event object stores a record of one or more actions performed by a user, further comprising:
means for generating the metadata for each event object based on the record of the one or more actions performed by the user; and
means for storing the event objects with their associated metadata.

15. The system of claim 11, further comprising:
means for generating a web services description language document from the template; and
means for providing the web services description language document to third party users over a network.

16. The method of claim 1, further comprising:
providing a web service interface to the application program to a third party user, the web service interface being based on the generated data input template and having a structure corresponding to a structure of the client interface;
receiving data from the web service interface, the received data being entered at the web service interface according to the sequence associated with the data input template; and
transmitting the received data to the application program for processing.

17. The computer-readable storage medium of claim 6, further comprising provided: a web service interface to the application program to a third party user, the web service interface being based on the generated data input template and having a structure corresponding to a structure of the client interface;

receiving data from the web service interface, the received data being entered at the web service interface according to the sequence associated with the data input template; and transmitting the received data to the application program for processing.

18. The system of claim 11, further comprising:

means for providing a web service interface to the application program to a third party user, the web service interface being based on the generated data input template and having a structure corresponding to a structure of the client interface;

means for receiving data from the web service interface, the received data being entered at the web service interface according to the sequence associated with the data input template; and means for transmitting the received data to the application program for processing.

* * * * *